(12) United States Patent
Ooe et al.

(10) Patent No.: US 8,033,721 B2
(45) Date of Patent: Oct. 11, 2011

(54) TEMPERATURE SENSOR CIRCUIT

(75) Inventors: Takatoshi Ooe, Nagano (JP); Ryuu Saitou, Nagano (JP); Morio Iwamizu, Nagano (JP)

(73) Assignee: Fuji Electric Co., Ltd. (JP)

( * ) Notice: Subject to any disclaimer, the term of this patent is extended or adjusted under 35 U.S.C. 154(b) by 479 days.

(21) Appl. No.: 12/334,912

(22) Filed: Dec. 15, 2008

(65) Prior Publication Data

US 2009/0153227 A1    Jun. 18, 2009

(30) Foreign Application Priority Data

Dec. 13, 2007    (JP) .................................. 2007-322184

(51) Int. Cl.
*G01K 7/01* (2006.01)
*G01K 1/12* (2006.01)
*H02H 3/027* (2006.01)

(52) U.S. Cl. ........... 374/178; 702/130; 327/513; 361/89

(58) Field of Classification Search ................. 374/170, 374/178, E15.001, E7.036; 702/130–136; 257/467, 470; 361/88, 89, 93.8, 56; 327/512, 327/513, 100, 365, 392, 398, 399, 575
See application file for complete search history.

(56) References Cited

U.S. PATENT DOCUMENTS

| | | | | |
|---|---|---|---|---|
| 5,355,123 | A * | 10/1994 | Nishiura et al. | 340/653 |
| 5,698,887 | A * | 12/1997 | Kumano et al. | 257/467 |
| 5,900,775 | A * | 5/1999 | Tihanyi | 327/543 |
| 6,205,010 | B1 * | 3/2001 | Ohsaka et al. | 361/103 |
| 6,541,999 | B2 * | 4/2003 | Gergintschw et al. | 326/32 |
| 7,052,180 | B2 * | 5/2006 | Shih | 374/178 |
| 7,350,974 | B2 * | 4/2008 | Mikuni et al. | 374/178 |
| 7,507,023 | B2 * | 3/2009 | Oyabe et al. | 374/178 |
| 7,795,950 | B2 * | 9/2010 | Igarashi | 327/513 |
| 2010/0008398 | A1 * | 1/2010 | Nojima | 374/178 |

FOREIGN PATENT DOCUMENTS

JP    61-233330 A    10/1986

* cited by examiner

*Primary Examiner* — Gail Verbitsky
(74) *Attorney, Agent, or Firm* — Rossi, Kimms & McDowell LLP

(57) ABSTRACT

A temperature sensor circuit is provided that facilitates preventing a too-high overshooting voltage from occurring at an output terminal when a power supply is connected to the temperature sensor circuit. The temperature sensor circuit includes a short-circuiting device, disposed in parallel to depletion mode NMOS, that short-circuits the drain and source of depletion mode NMOS when a power supply is connected; and delay device that transmits a signal for short-circuiting the drain and source of depletion NMOS for a certain period from the time point of power supply connection to short-circuiting device for preventing the voltage at output terminal of temperature sensor circuit from overshooting.

8 Claims, 10 Drawing Sheets

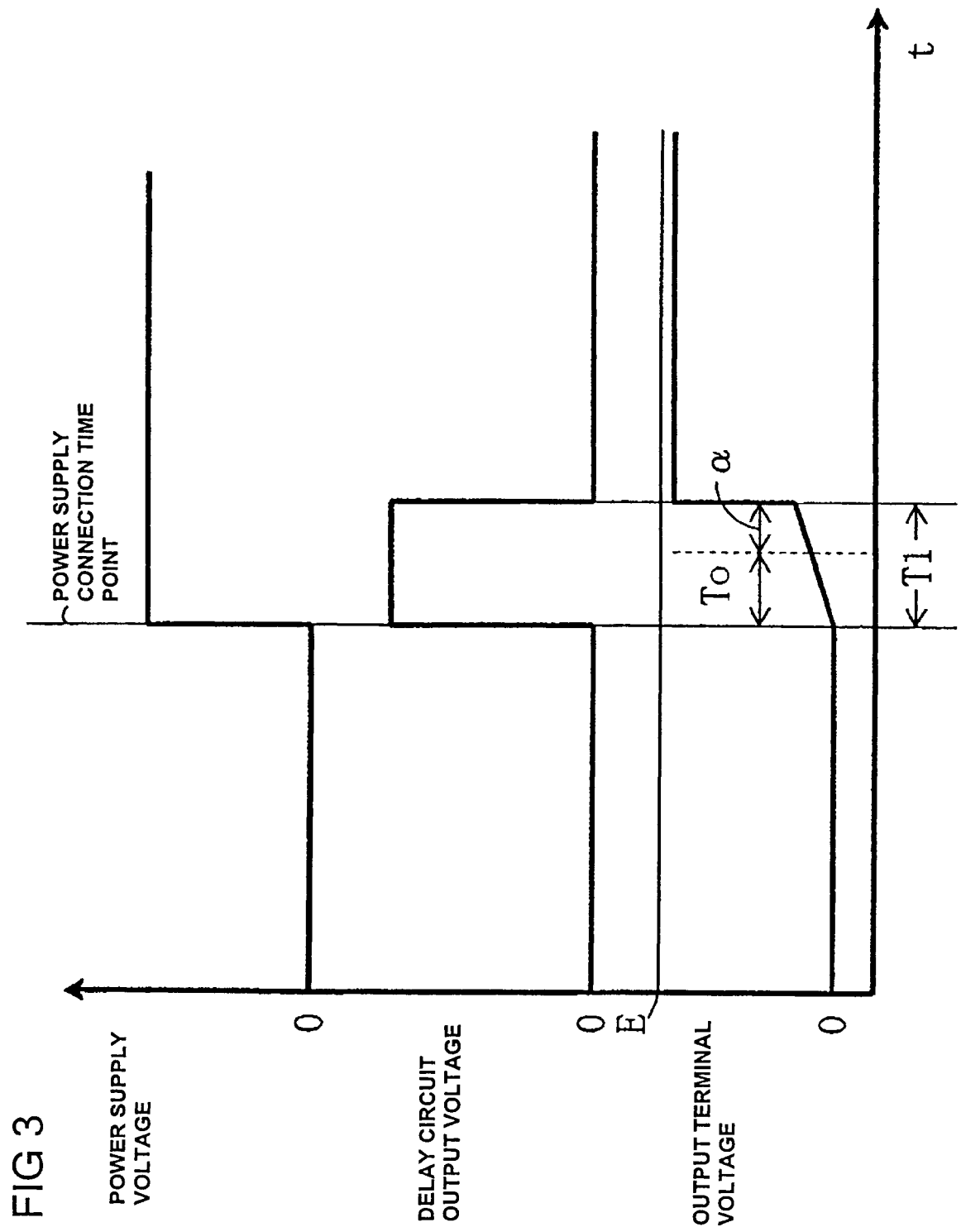

TEMPERATURE SENSOR CIRCUIT

BACKGROUND

The present invention relates to a temperature sensor circuit that includes a depletion mode MOS.

FIG. 7 is a circuit diagram showing a conventional temperature sensor circuit. In a conventional temperature sensor circuit 400, the collector of a first bipolar transistor 3 is connected to a power supply 1. The emitter of the first bipolar transistor 3 is connected to the drain of depletion mode NMOS 4, the gate and source thereof are short-circuited to each other. The source of depletion mode NMOS 4 is connected to ground 2. The base of the first bipolar transistor 3 is connected to the emitter of the second bipolar transistor 5, the collector thereof is connected to power supply 1. The base of the second bipolar transistor 5 is connected to the anode of diode 6, the cathode thereof is connected to power supply 1. The drain voltage of depletion mode NMOS 4 is connected to an output terminal 7. The conventional temperature sensor circuit is configured as described above.

The conventional temperature sensor circuit 400 is formed of a first current supply circuit and a second current supply circuit. The first current supply circuit, the output current thereof exhibits a positive temperature dependence, is formed of Darlington transistor 90, formed of first bipolar transistor 3 and second bipolar transistor 5, and diode 6 (Zener diode that works as a temperature detecting section). The output current from the first current supply circuit is injected into depletion mode NMOS 4 that works as the second current supply circuit. Conventional temperature sensor circuit 400 is designed such that the voltage at the output terminal 7 exhibits a positive temperature dependence.

Specifically, the first and second current supply circuits constituting temperature sensor circuit 400 are formed on semiconductor substrate 500, on which a power switching device (power NMOS 60) that controls the electric power fed to load 70 is formed. As the temperature of semiconductor substrate 500 rises due to the operation of the power switching device, diode 6 that works as a temperature detecting section constituting the first current supply circuit is in a state in which a high leakage current flows through diode 6. In other words, Darlington transistor 90 is in a state in which the impedance thereof is small.

As power supply 1 is connected to temperature sensor circuit 400 in the state in which the impedance of Darlington transistor 90 is small, a gate current (leakage current) flows to the first bipolar transistor 3 in the front stage of Darlington transistor 90 constituting the first current supply circuit. The gate current is amplified by the second bipolar transistor 5 in Darlington transistor 90, making a high collector current flow. The high collector current flows into depletion mode NMOS 4 (depletion-type n-channel MOSFET working for a constant current circuit) constituting the second current supply circuit.

Since the gate of depletion mode NMOS 4 is fixed at the potential of ground 2, the current flowing into depletion mode NMOS 4 increases almost instantaneously to the value of the current that flows through depletion mode NMOS 4, the gate of which is fixed at the potential of ground 2. The increasing current enters a saturation region as described in FIG. 8, causing a constant current. FIG. 8 is a curve relating the drain voltage and the drain current of depletion mode NMOS 4 with each other, the gate voltage of which is fixed at the ground potential.

Output terminal 7 is connected to the gate of a MOSFET in a not-shown signal processing circuit. Any current does not flow through output terminal 7. In the state described above, the voltage at output terminal 7 is determined by the ratio of the impedance of depletion mode NMOS 4 and the impedance of Darlington transistor 90. When the temperature of semiconductor substrate 500 is low, the leakage current flowing through diode 6 is small. Therefore, since the gate current of first bipolar transistor 3 is small, the impedance of Darlington transistor 90 is larger than the impedance of depletion mode NMOS 4. Therefore, the voltage at output terminal 7, equal to the drain voltage of depletion mode NMOS 4, is low.

Since the leakage current flowing through diode 6 is high when the temperature of semiconductor substrate 500 is high, the gate current of first bipolar transistor 3 is high and the impedance of Darlington transistor 90 becomes low. Therefore, the voltage at output terminal 7, equal to the drain voltage of depletion mode NMOS 4, is high.

FIG. 9 is a wave chart describing the waveforms of the power supply voltage, semiconductor substrate temperature and output terminal voltage, when a power supply is connected to the conventional temperature sensor circuit. In FIG. 9, the solid lines represent the characteristics when the temperature of semiconductor substrate 500 is low and the dotted lines represent the characteristics when the temperature of semiconductor substrate 500 is high. FIG. 10 is an expanded wave chart describing the waveforms in the period B in FIG. 9. The symbols $T_O$, α, and T1 in FIG. 10 will be used in the descriptions of FIG. 3 later.

As power supply 1 is connected to conventional temperature sensor circuit 400 when the temperature of semiconductor substrate 500 is low, power NMOS 60 formed on semiconductor substrate 500 works, raising the temperature of semiconductor substrate 500 finally to a certain temperature. The certain temperature is the temperature of semiconductor substrate 500 when power NMOS 60 is conducting the steady state operations thereof. In the period, in which the temperature of semiconductor substrate 500 is rising, the output terminal voltage also rises. Any overshoot is not caused almost in the output terminal voltage at the instance, at which the power supply is connected.

When the temperature of semiconductor substrate 500 is high enough to destroy power NMOS 60 connected to load 70 (the line A in FIG. 9), the voltage at output terminal 7 rises as high as a predetermined voltage E. As the voltage at output terminal 7 reaches the predetermined voltage E, an interrupting signal is fed to power NMOS 60 to turn off power NMOS 60 and to prevent power NMOS 60 from being broken down.

Unexamined Laid Open Japanese Patent Application Publication No. Sho. 61 (1986)-233330 (Page 1, Right-hand-side column, Line 19—Page 2, Left-hand side column, Line 8; and FIG. 7) discloses a temperature sensor circuit that connects a constant current circuit to a Darlington transistor. As power supply 1 is connected in a state, in which the temperature of semiconductor substrate 500 is high as described by the dotted lines in FIG. 9, a high in-rush current flows instantaneously to depletion mode NMOS 4 through Darlington transistor 90. As a high in-rush current flows as described above, the drain voltage of depletion mode NMOS 4 exceeds the saturation voltage to the higher side instantaneously as shown in FIG. 8, causing an overshoot.

At the time point, at which the overshooting voltage reaches the predetermined voltage E, an interrupting signal is fed to power NMOS 60, turning off power NMOS 60. As power NMOS 60 is turned off, the electric power is not fed to load 70. As described above, FIG. 10 is an expanded wave chart describing the waveforms in the period B in FIG. 9. As described in FIG. 10, the voltage at output terminal 7 is overshooting greatly at the time of power supply connection. In describing the output terminal voltage in FIG. 10, a solid line represents the output terminal voltage when the temperature of semiconductor substrate 500 is high and a broken line the output terminal voltage when the temperature of semiconductor substrate 500 is low.

As described above, power NMOS 60 is turned off and the electric power feed to load 70 is interrupted at the time point, at which the overshooting voltage reaches the predetermined voltage E. In other words, electric power is not fed to load 70 even when power supply 1 is connected.

The above-described reference does not describe anything on preventing an overshooting voltage from causing at the output terminal at the instance of connecting a power supply. In addition, the above-described reference does not describe anything on the use of a depletion mode NMOS for the constant current circuit.

In view of the forgoing, it would be desirable to obviate the problems described above. It would be also desirable to provide a temperature sensor circuit that facilitates preventing a too-high overshooting voltage from causing at the output terminal thereof when a power supply is connected to the temperature sensor circuit.

SUMMARY OF THE INVENTION

According to an aspect of the invention, a temperature sensor circuit is provided that includes a first switching device having a collector connected to a power supply, a gate, and an emitter, a diode including an anode connected to the gate of the first switching device and a cathode connected to the collector of the first switching device, a depletion mode n-channel MOSFET (hereinafter referred to as a "depletion mode NMOS") including a drain connected to the emitter of the first switching device, a source connected to the ground, and a gate fixed at the ground potential, an output terminal connected to the drain of the depletion mode NMOS a short-circuiting device that connects the output terminal to the ground, and a delay mechanism that outputs a signal that makes the short-circuiting device work for a predetermined period of time from the time point, at which the power supply is connected to the temperature sensor circuit. By short-circuiting the depletion mode NMOS with the short-circuiting device for a certain period determined by the delay device, the voltage at the output terminal is prevented from overshooting when the power supply is connected to the temperature sensor circuit.

The first switching device is preferably a Darlington transistor. By using a Darlington transistor, the leakage current caused in the diode is amplified greatly and a wide voltage range is obtained advantageously at the output terminal with respect to the semiconductor substrate temperature range.

The short-circuiting device is preferably formed of a second switching device. Specifically, the second switching device is preferably an enhancement mode n-channel MOSFET, preferably.

In addition, the delay device is preferably formed of a delay circuit including an inverter, an even number of the inverter circuits being connected in series to each other.

Preferably, the delay circuit includes a resistor, having a first end connected to the output point of the inverter circuit in the front stage, and a capacitor, having a first end connected to the second end of the resistor and to the input point of the inverter circuit in the next stage, the capacitor having a second end connected to the ground. The delay circuit having the configuration described above facilitates elongating the delay time.

Further, the delay circuit preferably further includes a resistor having a first end connected to the output point of the inverter circuit in the front stage and a second end connected to the input point of the inverter circuit in the next stage. The delay circuit having the configuration described above facilitates elongating the delay time.

Still further, the delay circuit preferably further includes a capacitor having a first end connected to the output point of the inverter circuit in the front stage and a second end connected to the ground. The delay circuit having the configuration described above facilitates elongating the delay time.

According to the invention, an NMOS that works as a short-circuiting device is disposed between the output terminal of the temperature sensor circuit and the ground. The NMOS is made to be ON with a delay circuit for a predetermined period of time from the time point, at which a power supply is connected to the temperature sensor circuit. The scheme described above facilitates reducing the impedance between output terminal 7 and ground 2 and dividing the inrush current flowing from power supply 1 to the NMOS. By dividing the inrush current to the NMOS, the overshooting voltage caused at output terminal 7 is reduced greatly. Since the overshooting voltage is reduced greatly, electric power is fed stably to the load even when the power supply is connected to the temperature sensor circuit.

BRIEF DESCRIPTION OF THE DRAWINGS

The invention will now be described in greater detail with reference to certain preferred embodiments thereof and the accompanying drawings, wherein:

FIG. 3 is a wave chart describing the power supply voltage waveform of temperature sensor circuit 300 in FIG. 2(a), the output voltage waveform of the delay circuit (drain voltage of NMOS 38) and the voltage waveform at output terminal 7;

DETAILED DESCRIPTION OF THE PREFERRED EMBODIMENTS

Figure 1:
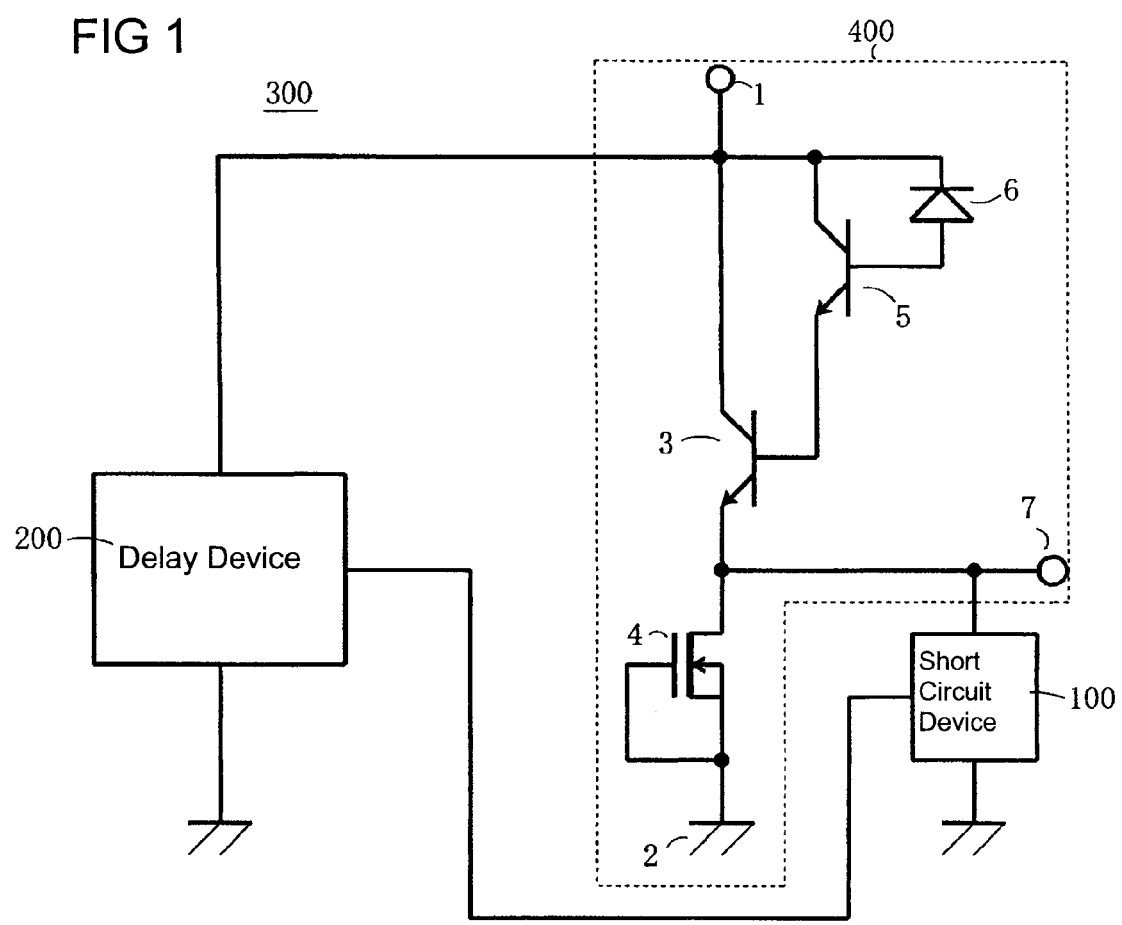
FIG. 1 is a block circuit diagram for describing the modes for carrying out the invention.

FIG. 1 is a block circuit diagram for describing the modes for carrying out the invention. Referring now to FIG. 1, a temperature sensor circuit 300 according to the invention includes a short-circuiting device 100 and a delay device 200. Short-circuiting device 100 is disposed in parallel to depletion mode NMOS 4 of conventional temperature sensor circuit 400. Short-circuiting device 100 short-circuits the drain and source of depletion mode NMOS 4. Delay device 200 transmits a signal for short-circuiting depletion mode NMOS 4 for a predetermined time period from the power supply connection to short-circuiting device 100. By short-circuiting depletion mode NMOS 4 at the power supply connection, the voltage at output terminal 7 of the temperature sensor circuit is prevented from overshooting.

Now the invention will be described below in detail with reference to the accompanied drawings which illustrate the preferred embodiments of the invention. The same reference numerals and symbols as used in FIG. 1 and in FIGS. 7 through 10 are used to designate the same constituent elements.

First Embodiment

Figure 2A:
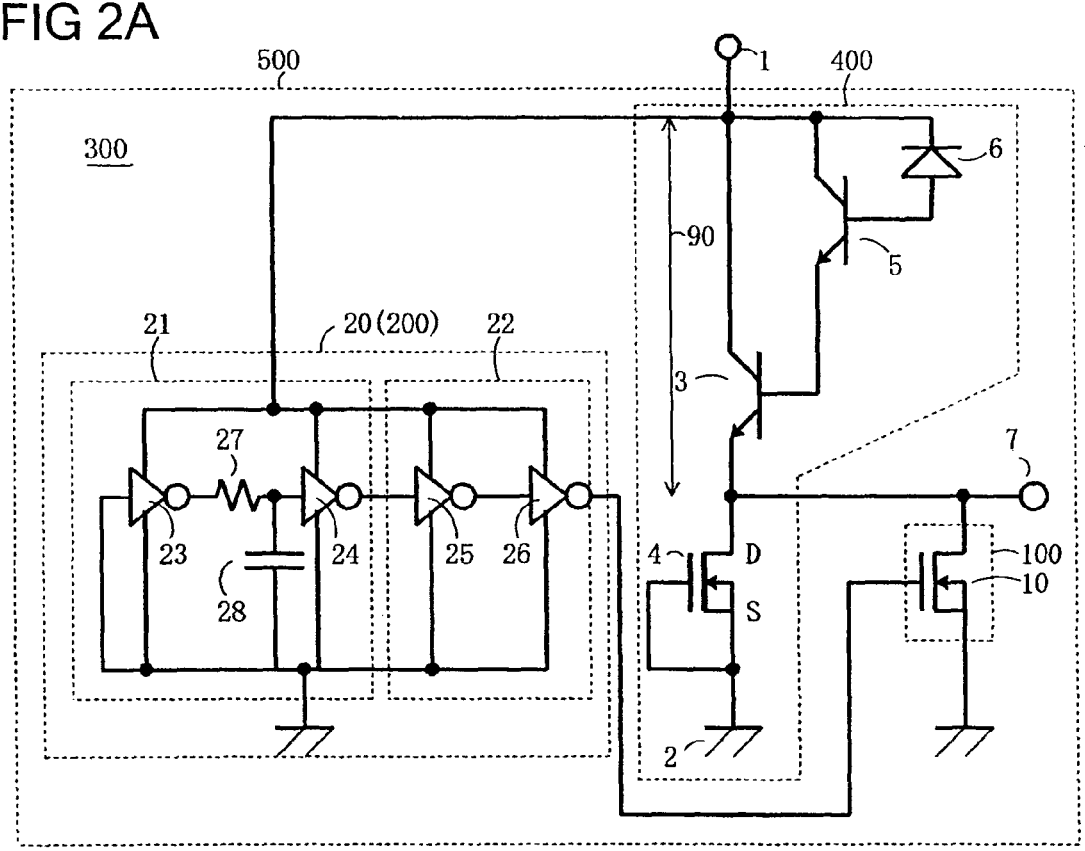
FIG. 2(a) is a circuit diagram showing a temperature sensor circuit according to a first embodiment of the invention including a delay circuit formed of an inverter circuit.
Figure 2B:
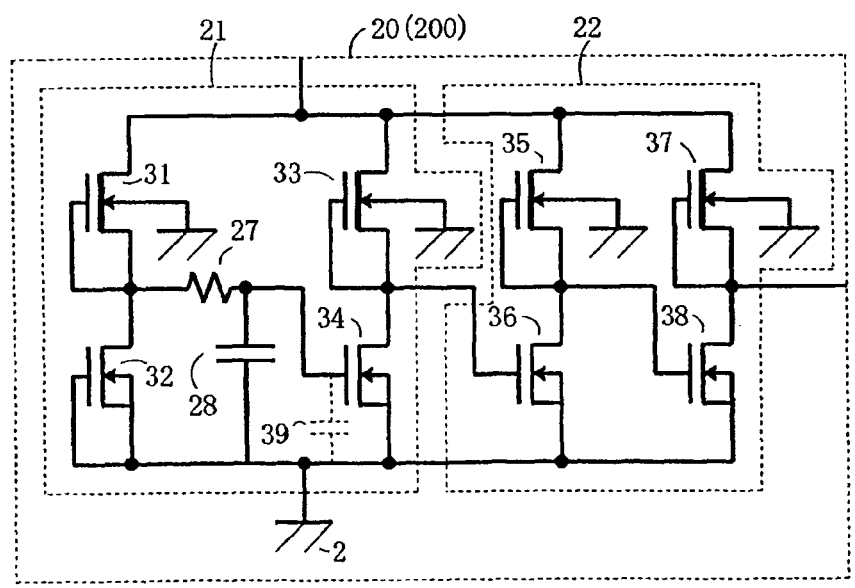
FIG. 2(b) is a circuit diagram describing the delay circuit shown in FIG. 2(a) in detail.

FIG. 2(a) is a circuit diagram showing a temperature sensor circuit according to a first embodiment of the invention including a delay circuit formed of an inverter circuit. FIG. 2(b). is a circuit diagram describing the delay circuit shown in FIG. 2(a) in detail.

Temperature sensor circuit 300 according to the invention is different from conventional temperature sensor circuit 400 in that delay circuit 20 formed of four inverter circuits 23 through 26 and n-channel MOSFET (hereinafter referred to as "NMOS") 10 that short-circuits the source S and drain D of depletion mode NMOS 4 are disposed additionally in temperature sensor circuit 300 according to the invention. Delay circuit 20 is formed of delay section 21 and buffer section 22 that shapes the output signal waveform outputted from delay section 21. Power NMOS 60 shown in FIG. 7 and formed on semiconductor substrate 500 is not shown in FIG. 2.

The collector of first bipolar transistor 3 is connected to power supply 1. The emitter of first bipolar transistor 3 is connected to the drain of depletion mode NMOS (depletion-type n-channel MOSFET) 4, the gate and source thereof are short-circuited to each other. The source of depletion mode NMOS 4 is connected to ground 2.

The base of first bipolar transistor 3 is connected to the emitter of second bipolar transistor 5, the collector of which is connected to power supply 1. The base of second bipolar transistor 5 is connected to the anode of diode (e.g. a Zener diode working as a temperature detecting section) 6, the cathode of which is connected to power supply 1. The drain voltage of depletion mode NMOS 4 is connected to output terminal 7. Temperature sensor circuit 300 according to the invention is obtained by adding delay circuit 20 and NMOS 10 to conventional temperature circuit 400.

In FIG. 2(a), delay circuit 20 is connected between power supply 1 and ground 2. Delay circuit 20 includes delay section 21, formed of two inverter circuits 23, 24, resistor 27, and capacitor 28, and buffer section 22, formed of two inverter circuits 25 and 26. Resistor 27 and capacitor 28 are formed on semiconductor substrate 500 using a semiconductor process.

The input to first inverter circuit 23 constituting delay section 21 (the gate of NMOS 32 in FIG. 2(b)) is connected to ground 2. The output from first inverter circuit 23 is connected to the input of second inverter circuit 24 (the gate of NMOS 34 in FIG. 2(b)) via resistor 27 and capacitor 28. The output from second inverter circuit 24 is connected to the input of third inverter circuit 25 (the gate of NMOS 36 in FIG. 2(b)) constituting buffer section 22. The output from third inverter circuit 25 is connected to the input of fourth inverter circuit 26 (the gate of NMOS 38 in FIG. 2(b)). The output from fourth inverter circuit 26 is connected to the output terminal of delay circuit 20. The output terminal of delay circuit 20 is connected to the gate of NMOS 10 disposed between output terminal 7 of temperature sensor circuit 300 according to the invention and ground 2. The delay time is determined by the resistance value of resistor 27 and the capacitance value of capacitor 28. The predetermined period $T_O$, for which depletion mode NMOS 4 is short circuited, can be set from the delay time. In delay section 21 and buffer section 22, an even number of inverter circuits are used to prevent inverting the logic signal between output of the delay section 21 and the input of the buffer section 22. To prevent inverting the logic signal between an input of the delay circuit and an output of the delay circuit, the total number of inverters used in delay section 21 and buffer section 22 should be even.

In FIG. 2(b), inverter circuits 23 through 26 constituting delay circuit 20 include depletion mode NMOS's 31, 33, 35, and 37, respectively, and enhancement mode NMOS's 32, 34, 36, and 38, respectively. (Hereinafter, enhancement mode NMOS's 32, 34, 36, and 38 will be referred to simply as "NMOS's 32, 34, 36, and 38".) The gates of depletion mode NMOS's 31, 33, 35, and 37 are connected to ground 2.

As the power supply is connected, capacitor 28 is charged from depletion mode NMOS 31 constituting first inverter circuit 23 via resistor 27. As the voltage across capacitor 28 exceeds the gate threshold voltage value of NMOS 34 constituting second inverter circuit 24 to the higher side, NMOS 34 is turned on, shifting NMOS 36 constituting third inverter circuit 25 from the ON-state thereof to the OFF-state thereof and shifting NMOS 38 constituting fourth inverter circuit 26 from the OFF-state thereof to the ON-state thereof.

While NMOS 38 is OFF, NMOS 10 that short-circuits depletion mode NMOS 4 is in the ON-state thereof. By bringing NMOS 10 into the ON-state thereof, the current flowing through Darlington transistor 90 is divided, preventing the voltage at output terminal 7 from overshooting. At the time point, at which NMOS 38 becomes ON, NMOS 10 becomes OFF and temperature sensor circuit 300 according to the invention shits to the steady state operation mode.

In FIGS. 2(a) and 2(b), inverter circuits 23 through 26 in delay circuit 20 are formed of depletion mode NMOS's 31, 33, 35, and 37 and NMOS's 32, 34, 36, and 38, respectively. The circuit configuration determines the delay time from resistor 17 and capacitor 28 connected between first inverter circuit 23 and second inverter circuit 24, even when the number of inverter circuit steps is increased and a resistor and a capacitor are connected to the output of each inverter circuit.

Although not illustrated, delay section 21 is formed of a plurality of inverter circuits connected in series to each other. Each inverter circuit is formed of a complementary MOS (hereinafter referred to as a "CMOS") formed of an enhancement mode PMOS and an enhancement mode NMOS. The output of the inverter circuit in the preceding stage is connected to the input of the inverter circuit in the succeeding (next) stage. A resistor and a capacitor are connected between the output of the inverter circuit in the preceding stage and the input of the inverter circuit in the next stage as shown in FIG. 2(b). As the stage number of the inverter circuits is increased, the delay time is elongated in proportion to the increased stage number of the inverter circuits.

FIG. 3 is a wave chart describing the power supply voltage waveform of temperature sensor circuit 300 in FIG. 2(a), the output voltage waveform of the delay circuit (the drain voltage of NMOS 38) and the voltage waveform at output terminal 7.

Figure 9:
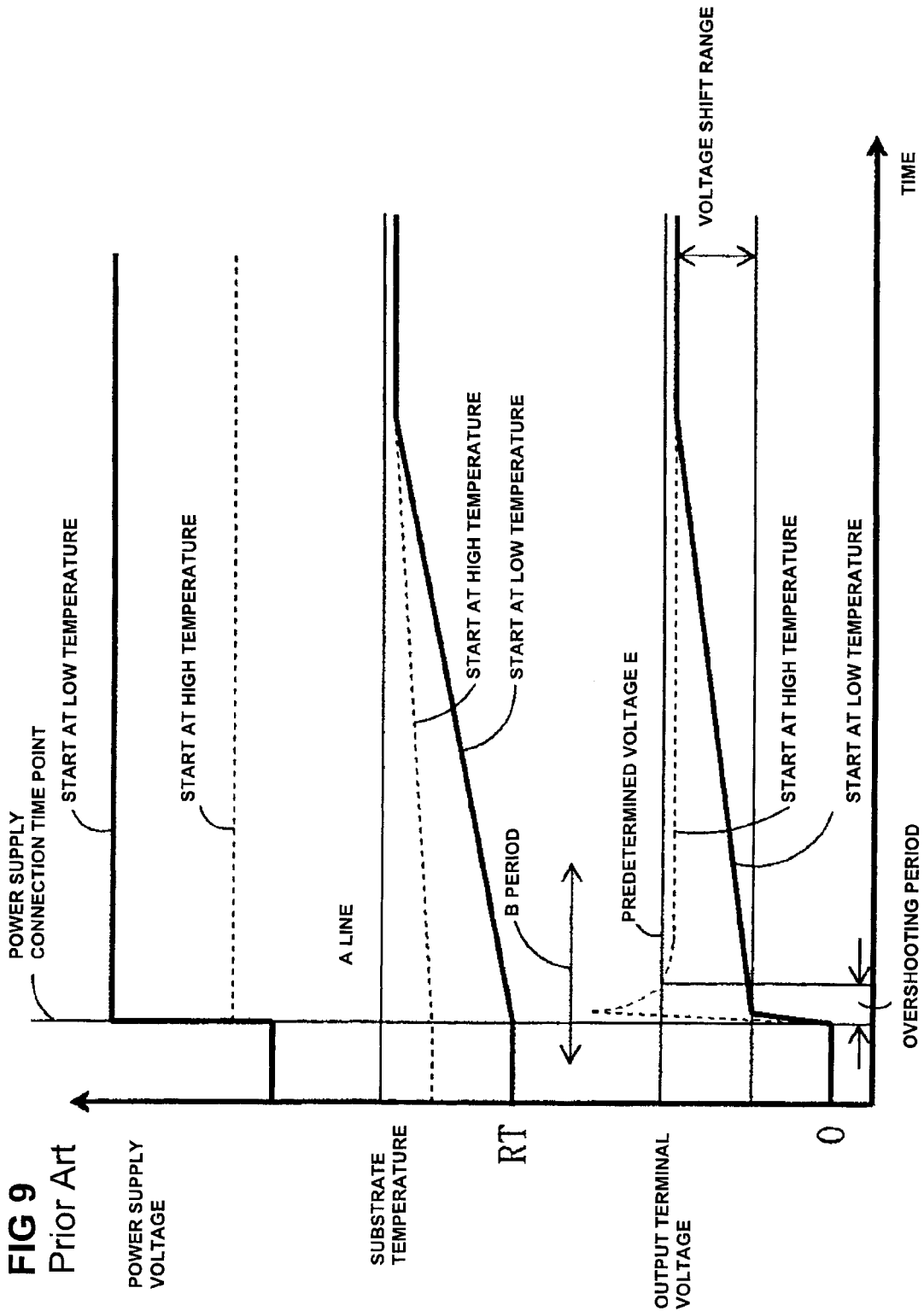
FIG. 9 is a wave chart describing the waveforms of the power supply voltage, semiconductor substrate temperature and output terminal voltage, when a power supply is connected.
Figure 10:
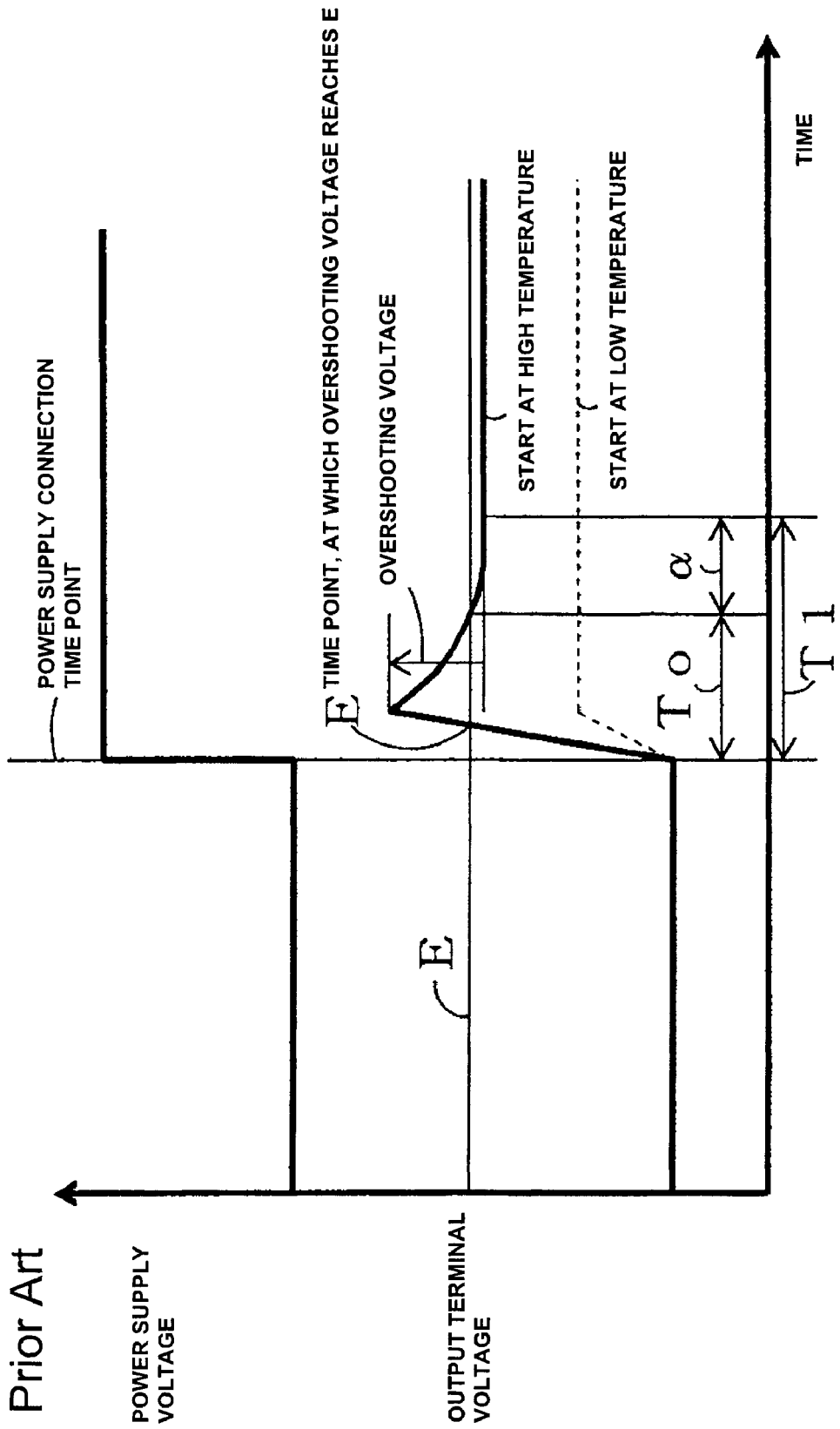
FIG. 10 is an expanded wave chart describing the waveforms in the period B in FIG. 9.

The period $T_O$ is defined as a period, within which the overshooting voltage (jumping-up voltage) described in FIGS. 9 and 10 is attenuated to the voltage at output terminal 7 (predetermined voltage E) on the level, at which power NMOS (power n-channel MOSFET) 4 is turned off in the circuit configuration shown in FIG. 2(a). Power NMOS 4 feeds electric power to load 70. For the period $T_O$, NMOS 10 is made to be ON and the collector current flowing through Darlington transistor 90 is made to flow through NMOS 10 so that the impedance of NMOS 10 may be lowered greatly by the impedance of Darlington transistor 90.

By the scheme described above, the drain voltage of depletion mode NMOS 4 is prevented from rising too high so that the voltage at output terminal 7 may be lower than the predetermined voltage E.

In practice, for lowering the overshooting voltage securely below the predetermined voltage E, a leeway period α is added to the period $T_O$ as described in FIG. 3 such that a predetermined period $T1=T_O+α$ is defined. For the predetermined period T1, NMOS 10 is turned on to short-circuit the drain and source of depletion mode NMOS 4. If the period $T_O$, within which the overshooting voltage lowers below the predetermined voltage E, is around 100 μs for example, the predetermined period T1 defined with a certain leeway as $T_O+α$, for which NMOS 10 is turned on, will be set around 200 μs.

Although short-circuiting device 100 has been described in connection with the use of NMOS 10, switching devices such as an insulated gate bipolar transistor (hereinafter referred to as an "IGBT") and a bipolar transistor may be used in substitution for NMOS 10 with no problem. When any of the alternative switching devices is used, it is necessary to dispose a delay circuit that drives the gate of the alternative switching device.

Second Embodiment

Figure 4:
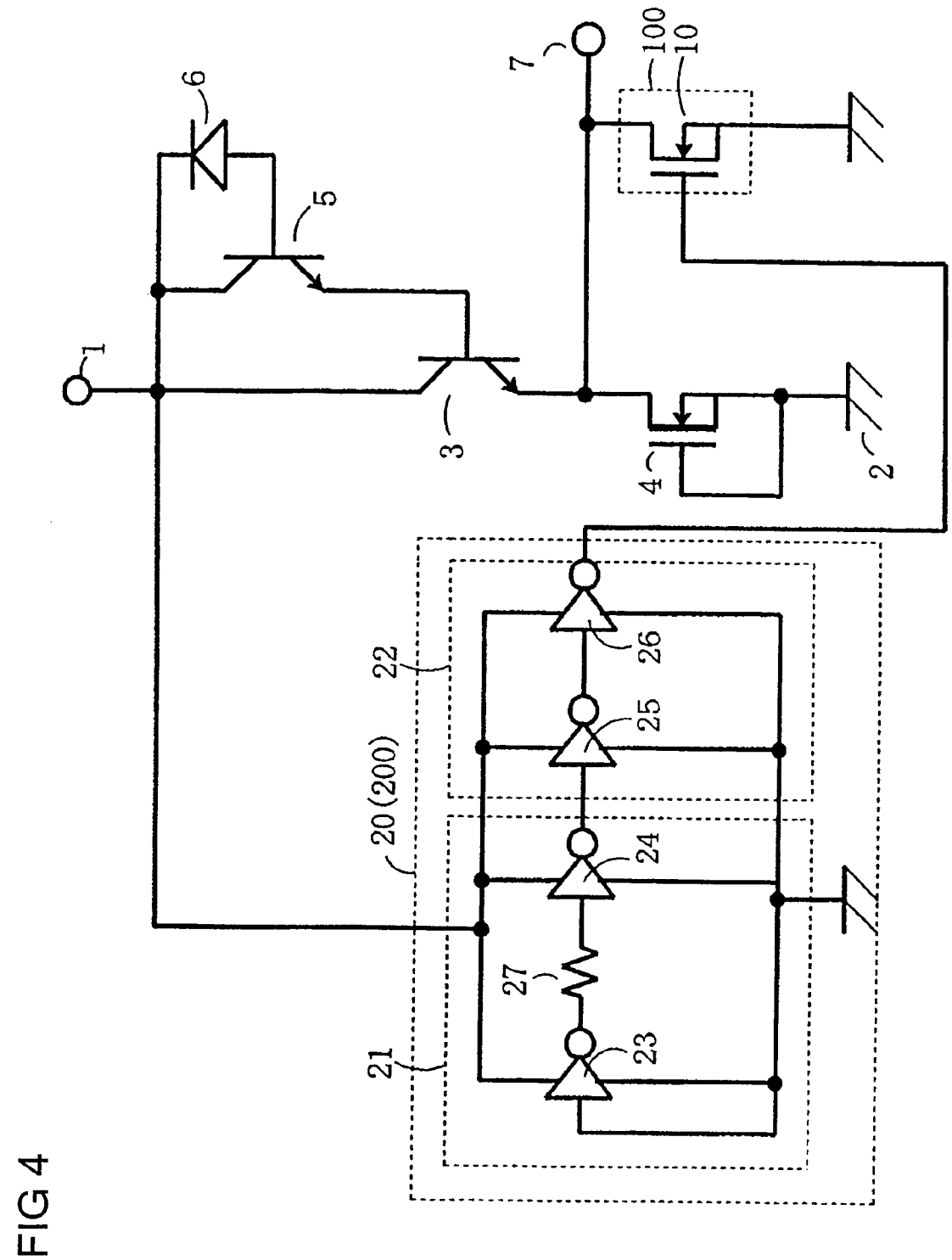
FIG. 4 is a circuit diagram showing a temperature sensor circuit according to a second embodiment of the invention.

FIG. 4 is a circuit diagram showing a temperature sensor circuit according to a second embodiment of the invention. The temperature sensor circuit according to the second embodiment is different from the temperature sensor circuit shown in FIGS. 2(a) and 2(b) in that gate capacitance 39 of NMOS 34 shown in FIG. 2(b) is used in substitution for capacitor 28 in delay section 21 constituting delay circuit 20. In this case, it is necessary to increase the gate capacitance 39 of NMOS 34 illustrated by the broken lines in FIG. 2(b).

Third Embodiment

Figure 5:
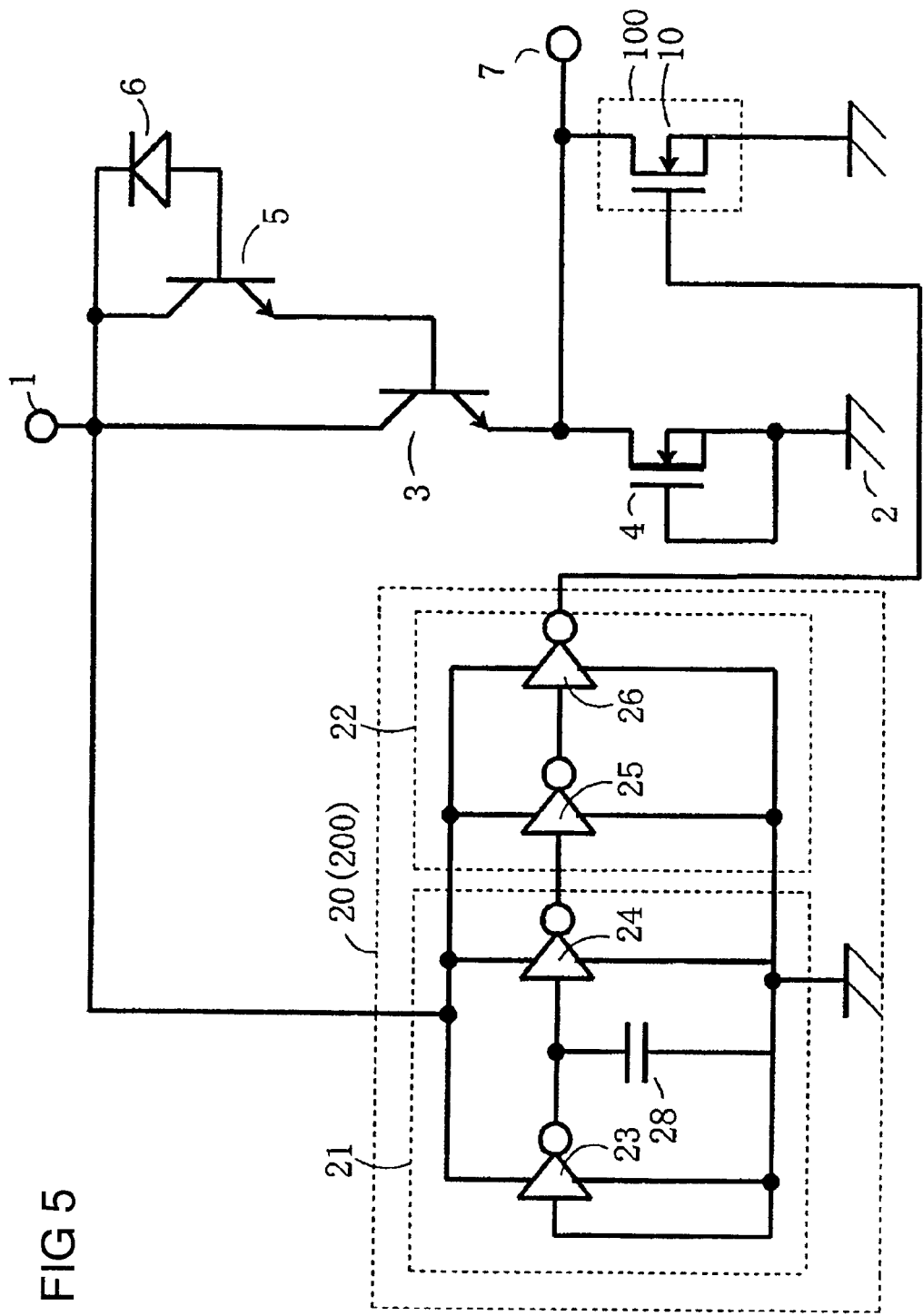
FIG. 5 is a circuit diagram showing a temperature sensor circuit according to a third embodiment of the invention.

FIG. 5 is a circuit diagram showing a temperature sensor circuit according to a third embodiment of the invention. The temperature sensor circuit according to the third embodiment is different from the temperature sensor circuit shown in FIGS. 2(a) and 2(b) in that the resistance of depletion mode NMOS 31 shown in FIG. 2(b) is used in substitution for resistor 27 in delay section 21 constituting delay circuit 20. In this case, it is necessary to increase the internal resistance of NMOS 31 shown in FIG. 2(b).

Fourth Embodiment

Figure 6:
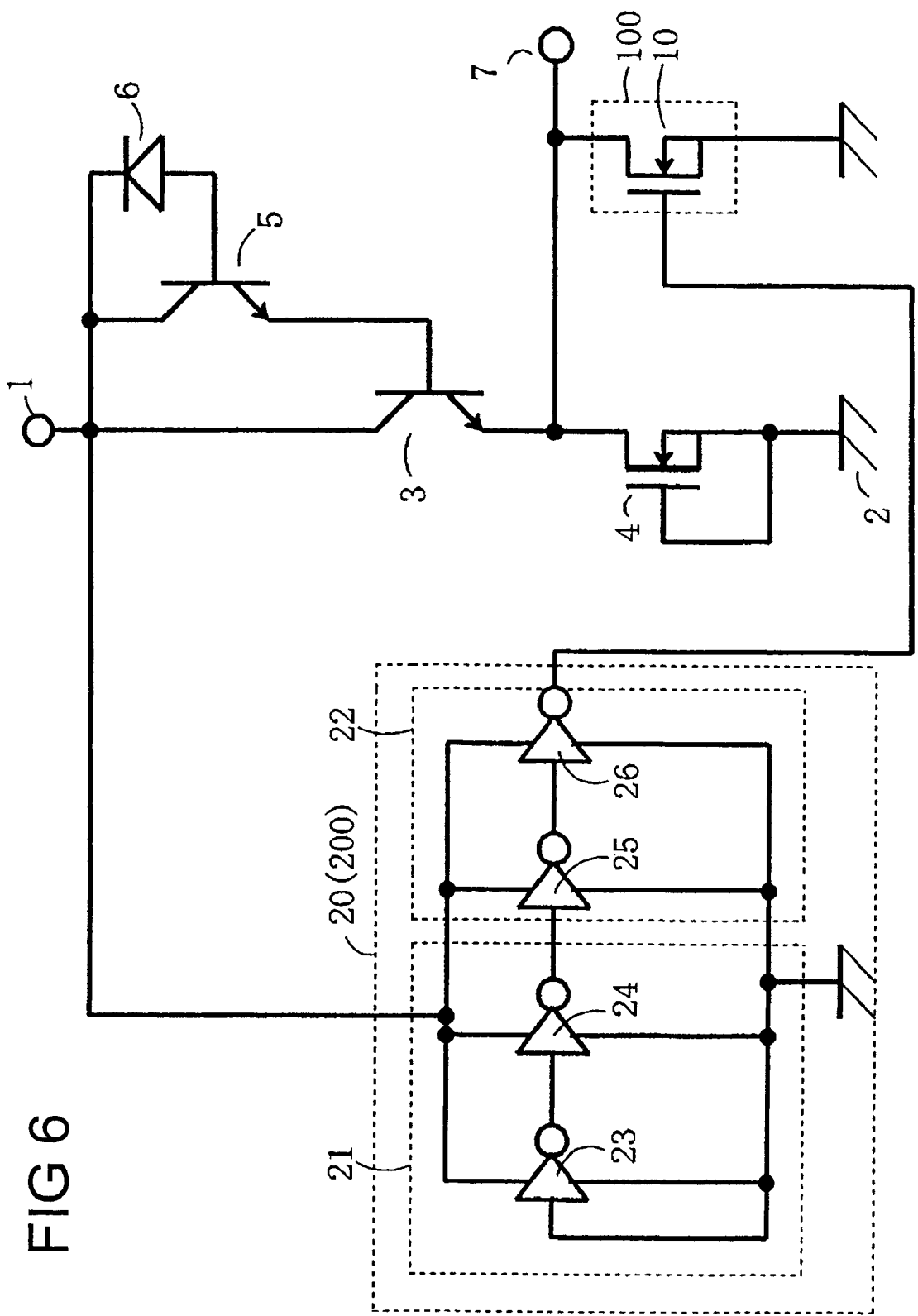
FIG. 6 is a circuit diagram showing a temperature sensor circuit according to a fourth embodiment of the invention.
Figure 7:
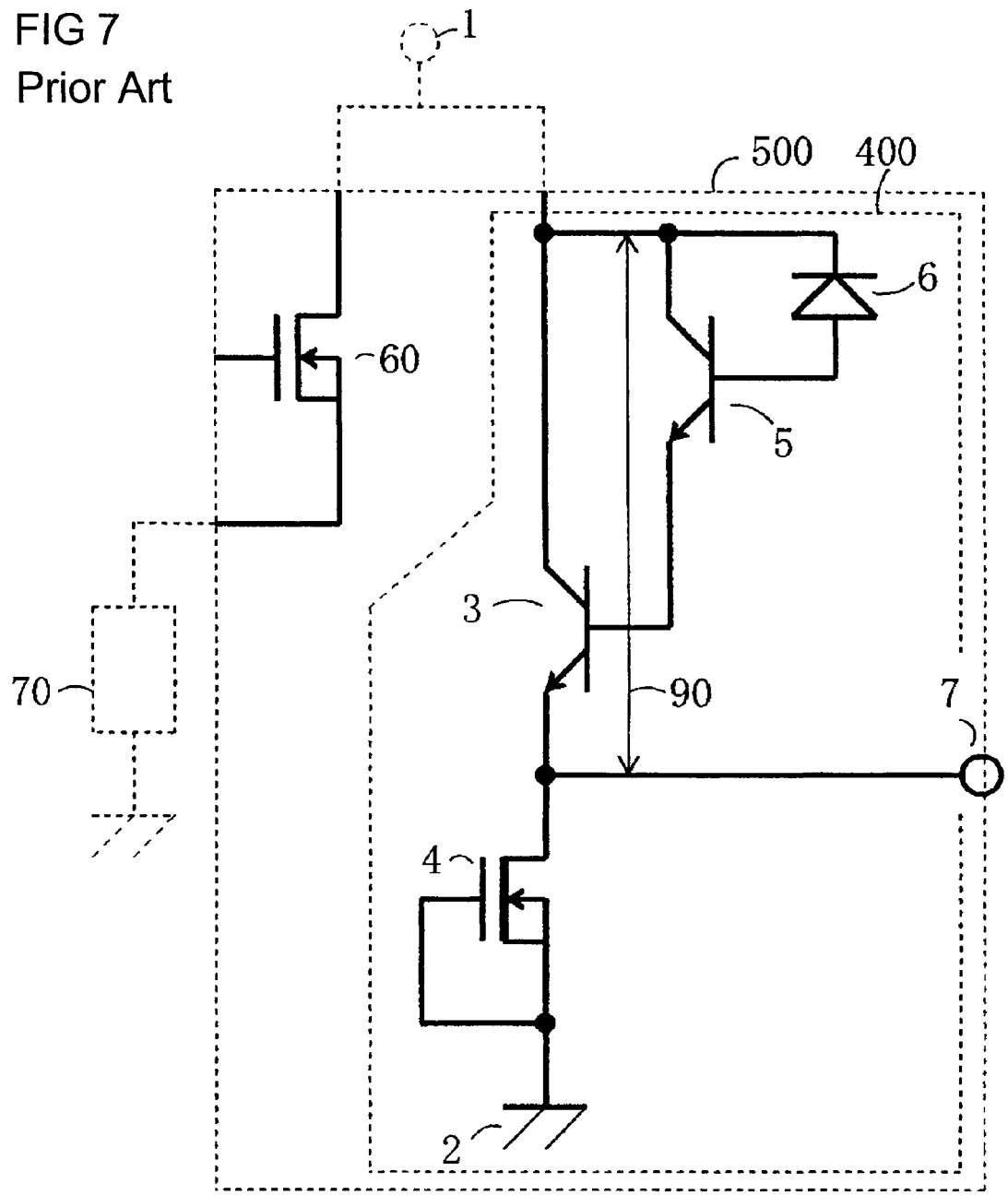
FIG. 7 is a circuit diagram showing a conventional temperature sensor circuit.
Figure 8:
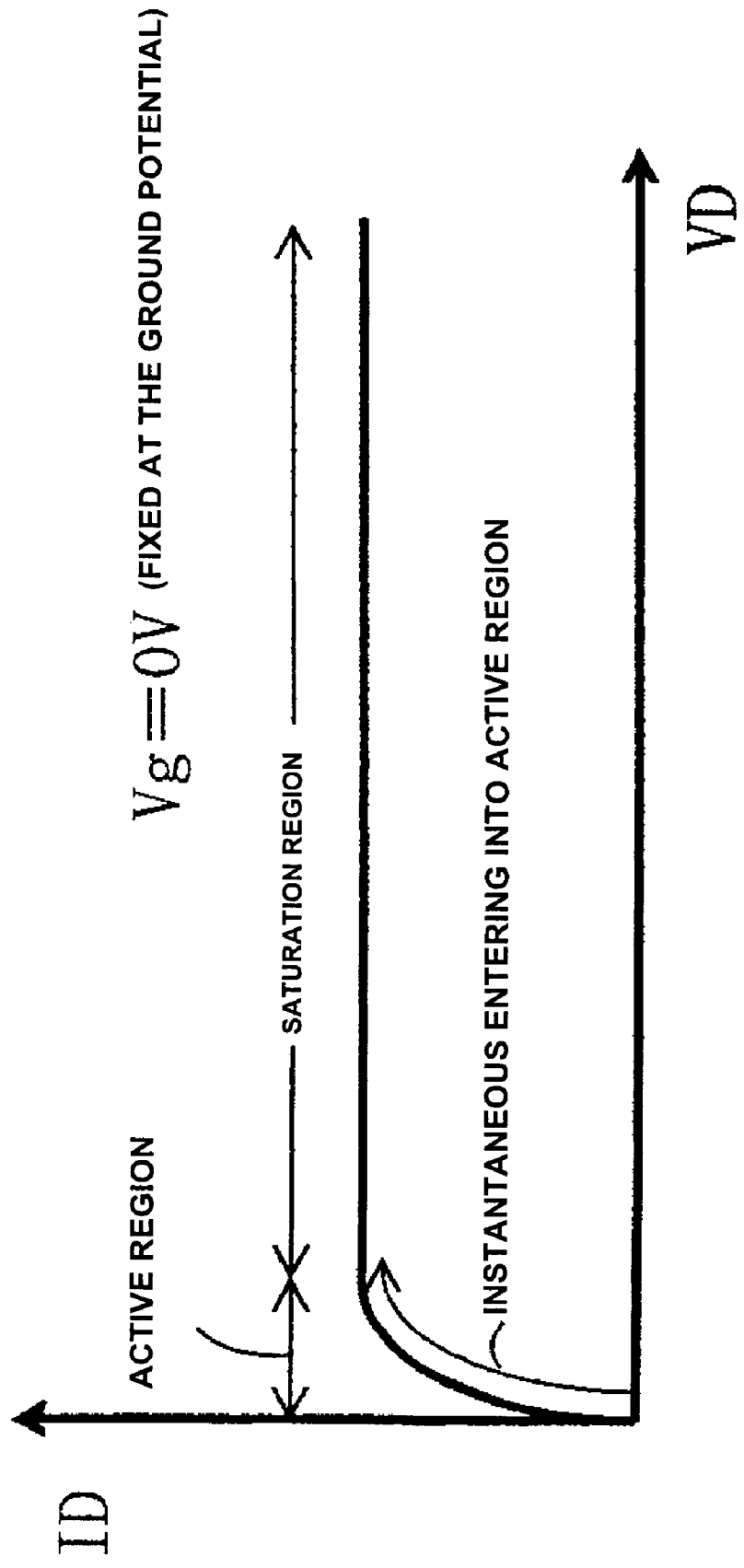
FIG. 8 is a curve relating the drain voltage and the drain current of depletion mode NMOS 4, the gate voltage of which is fixed at the ground potential.

FIG. 6 is a circuit diagram showing a temperature sensor circuit according to a fourth embodiment of the invention. The temperature sensor circuit according to the fourth embodiment is different from the temperature sensor circuit shown in FIGS. 2(a) and 2(b) in that the internal resistance of depletion mode NMOS 31 shown in FIG. 2(b) and the gate capacitance of NMOS 34 shown in FIG. 2(b) are used in substitution for resistor 27 and capacitor 28, respectively, in delay section 21 constituting delay circuit 20. In this case, it is necessary to increase the internal resistance of depletion mode NMOS 31 and the gate capacitance of NMOS 34 shown in FIG. 2(b).

This application is based on, and claims priority to, Japanese Patent Application No: 2007-322184, filed on Dec. 13, 2007. The disclosure of the priority application, in its entirety, including the drawings, claims, and the specification thereof, is incorporated herein by reference.

What is claimed is:

1. A temperature sensor circuit comprising:
a first switching device comprising a collector connected to a power supply, a gate, and an emitter;
a diode comprising an anode connected to the gate of the first switching device and a cathode connected to the collector of the first switching device;
a depletion mode n-channel MOSFET comprising a drain connected to the emitter of the first switching device, a source connected to a ground, and a gate fixed at a ground potential;
an output terminal connected to the drain of the depletion mode n-channel MOSFET;
a short-circuiting device connecting the output terminal to the ground; and
a delay device outputting a signal that makes the short-circuiting device work for a predetermined period of time from a time point, at which the power supply is connected to the temperature sensor circuit.

2. The temperature sensor circuit according to claim 1, wherein the first switching device comprises a Darlington transistor.

3. The temperature sensor circuit according to claim 1, wherein the short-circuiting device comprises a second switching device.

4. The temperature sensor circuit according to claim 3, wherein the second switching device comprises an enhancement mode n-channel MOSFET.

5. The temperature sensor circuit according to claim 1, wherein the delay device comprises a delay circuit comprising an inverter circuit, an even number of the inverter circuits being connected in series to each other.

6. The temperature sensor circuit according to claim 5, wherein the delay circuit further comprises a resistor, comprising a first end connected to an output point of the inverter circuit in a preceeding stage, and a capacitor, comprising a first end connected to a second end of the resistor and to an input point of the inverter circuit in a next stage, the capacitor comprising a second end connected to the ground.

7. The temperature sensor circuit according to claim 5, wherein the delay circuit further comprises a resistor comprising a first end connected to an output point of the inverter circuit in a preceeding stage and a second end connected to an input point of the inverter circuit in a next stage.

8. The temperature sensor circuit according to claim 5, wherein the delay circuit further comprises a capacitor comprising a first end connected to an output point of the inverter circuit in a proceeding stage and a second end connected to the ground.

* * * * *